(12) United States Patent
Warashina et al.

(10) Patent No.: US 8,376,403 B2
(45) Date of Patent: Feb. 19, 2013

(54) STEERING COLUMN DEVICE

(75) Inventors: Toshihiko Warashina, Kosai (JP); Yota Uesaka, Toyohashi (JP)

(73) Assignee: Fuji Kiko Co., Ltd., Kosai-Shi, Shizuoka-Ken (JP)

( * ) Notice: Subject to any disclaimer, the term of this patent is extended or adjusted under 35 U.S.C. 154(b) by 159 days.

(21) Appl. No.: 13/034,941

(22) Filed: Feb. 25, 2011

(65) Prior Publication Data
US 2011/0210538 A1   Sep. 1, 2011

(30) Foreign Application Priority Data

Feb. 26, 2010 (JP) ................ P2010-042904

(51) Int. Cl.
*B62D 1/185* (2006.01)
*B62D 1/184* (2006.01)
*B62D 1/16* (2006.01)
*B62D 1/18* (2006.01)

(52) U.S. Cl. .......................... 280/775; 74/493
(58) Field of Classification Search .............. 280/775, 280/777, 779; 74/493
See application file for complete search history.

(56) References Cited

U.S. PATENT DOCUMENTS

| | | | | |
|---|---|---|---|---|
| 4,541,298 A * | 9/1985 | Strutt | ............... | 74/493 |
| 5,377,555 A * | 1/1995 | Hancock | ............... | 74/493 |
| 5,607,184 A * | 3/1997 | Barton | ............... | 280/775 |
| 6,419,269 B1 * | 7/2002 | Manwaring et al. | ........ | 280/775 |
| 7,413,222 B2 * | 8/2008 | Higashino et al. | ........ | 280/775 |
| 7,819,426 B2 * | 10/2010 | Streng et al. | ........ | 280/775 |
| 7,922,203 B2 * | 4/2011 | Matsuno | ............... | 280/777 |
| 8,042,426 B2 | 10/2011 | Jo | | |
| 2004/0000781 A1 | 1/2004 | Lange et al. | | |
| 2007/0137381 A1 * | 6/2007 | Arihara | ............... | 74/493 |
| 2009/0229399 A1 * | 9/2009 | Ozsoylu et al. | ........ | 74/493 |
| 2010/0242665 A1 * | 9/2010 | Nagamura et al. | ........ | 74/493 |
| 2010/0300238 A1 * | 12/2010 | Ridgway et al. | ........ | 74/493 |
| 2011/0056324 A1 * | 3/2011 | Park et al. | ............... | 74/493 |

FOREIGN PATENT DOCUMENTS

| | | |
|---|---|---|
| DE | 195 07 900 C1 | 6/1996 |
| DE | 10 2007 002 433 A1 | 6/2008 |
| EP | 1 359 082 A1 | 11/2003 |
| JP | 2002-046623 A | 2/2002 |
| JP | 2005-525958 A | 9/2005 |

OTHER PUBLICATIONS

European Search Report, Application No. EP 11 15 5911, issued on Dec. 13, 2011, eight (8) pages.

* cited by examiner

*Primary Examiner* — Ruth Ilan
*Assistant Examiner* — Darlene P Condra
(74) *Attorney, Agent, or Firm* — Nath, Goldberg & Meyer; Jerald L. Meyer; Stanley N. Protigal (57) ABSTRACT

A steering column device includes a mount bracket including a suspended portion hanging from a fixation portion. The suspended portion includes: a first wall extending along and adjacent to the jacket guide, a second wall located on an outside of the first wall in a vehicle width direction; and a front side wall and a rear side wall connecting front ends and rear ends of the first wall and the second wall to each other. Operation of an operating lever protruding from the suspended portion tightens a clamp bolt to connect and fix the jacket to the mount bracket.

5 Claims, 9 Drawing Sheets

STEERING COLUMN DEVICE

CROSS REFERENCE TO RELATED APPLICATION

This application is based upon and claims the benefit of priority from the prior Japanese Patent Application No. 2010-042904, filed on Feb. 26, 2010, the entire contents of which are incorporated herein by reference.

BACKGROUND OF THE INVENTION

1. Field of the Invention

The present invention relates to a steering column device provided with a jacket supporting a steering shaft rotatably.

2. Description of the Related Art

Japanese Unexamined Patent Application Publication No. 2002-46623 and Published Japanese Translation of PCT International Publication No. 2005-525958 disclose steering column devices of the related art, each of which includes a jacket supporting a steering shaft rotatably, a jacket guide configured to guide the jacket, and a lock mechanism configured to lock the jacket by tightening a clamp bolt.

Figure 1:
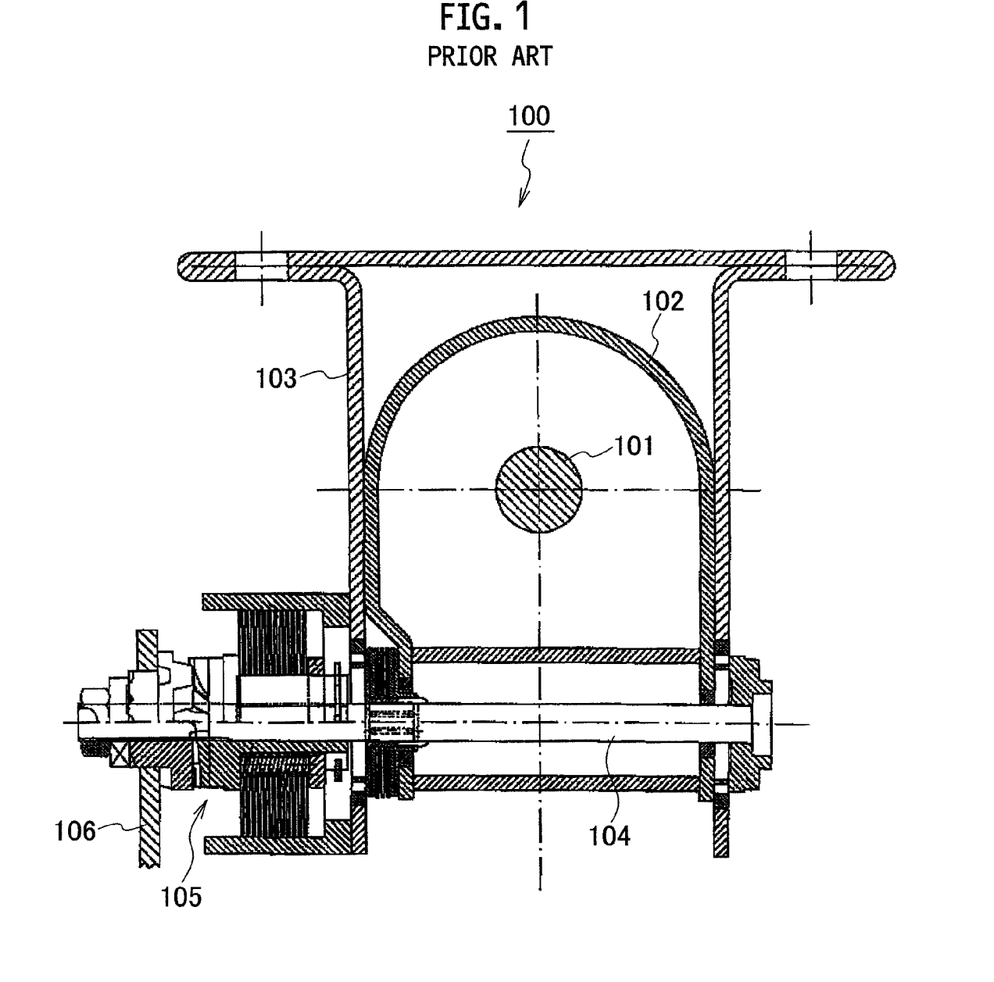
FIG. 1 is a cross-sectional view of a steering column device of the related art.

As shown in FIG. 1, a steering column device 100 disclosed in Japanese Unexamined Patent Application Publication No. 2002-46623 includes a steering shaft 101 to which a steering wheel (not shown) is to be fixed, a jacket 102 supporting the steering shaft 101 rotatably, a mount bracket 103 supporting the jacket 102 from both sides, a clamp bolt 104 penetrating the mount bracket 103 and the jacket 102, and a lock mechanism 105 configured to fasten and fix the jacket 102 to the mount bracket 103 by tightening the clamp bolt 104.

In the above-described configuration, when an operating lever 106 is rotated in a locking direction, the bolt 104 is pulled leftward in FIG. 1 by an action of the lock mechanism 105, whereby the jacket 102 is supported from both sides by the mount bracket 103, whereby the jacket 102 is locked to the mount bracket 103. Subsequently, when the operating lever 106 is rotated in an unlocking direction, the bolt 104 is released from the state of being pulled by the lock mechanism 105, and moves to the right side in FIG. 1 to release the state of locking the jacket 102 to the mount bracket 103.

Figure 2:
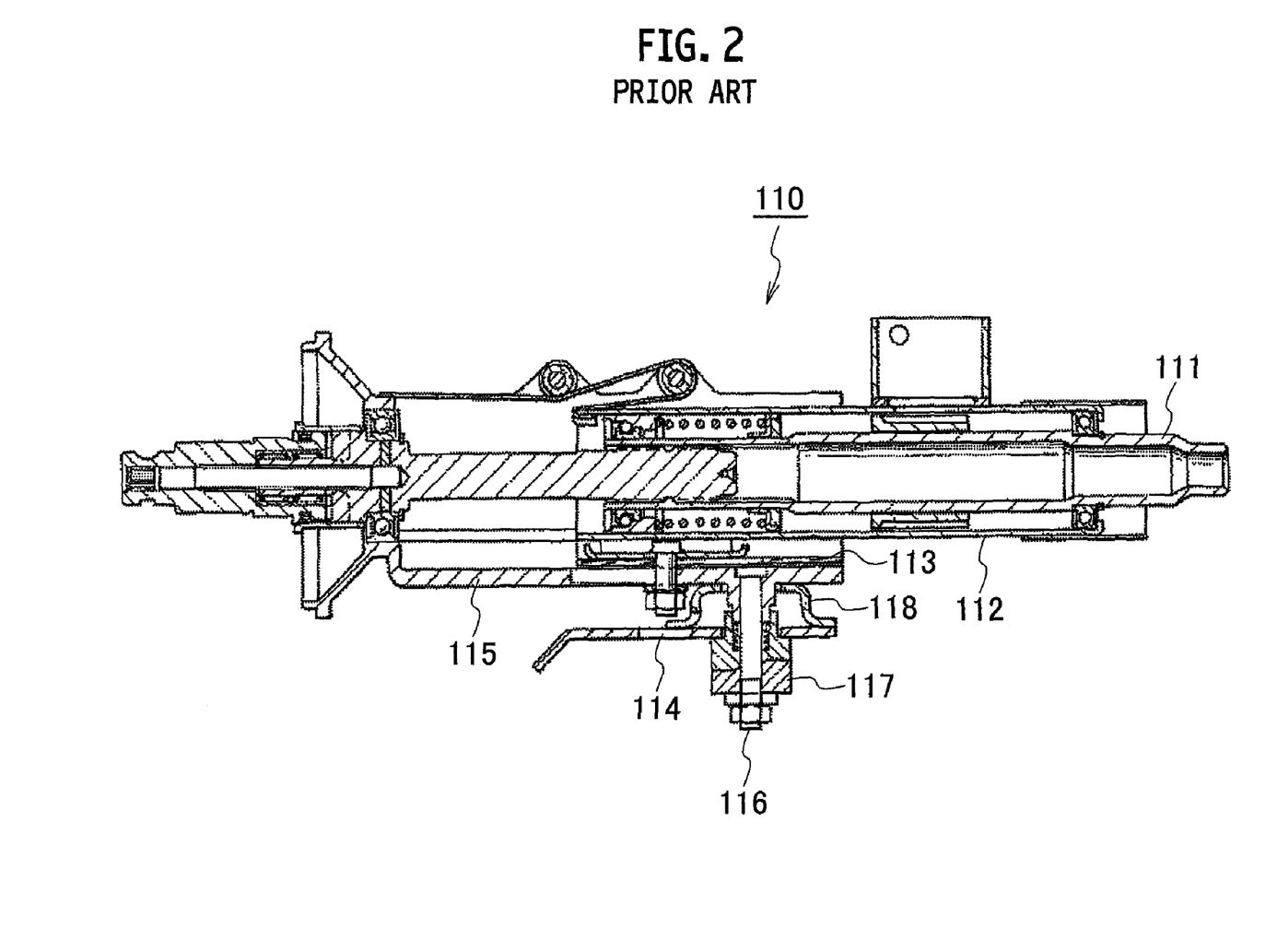
FIG. 2 is a cross-sectional view of another steering column device of the related art.
Figure 3:
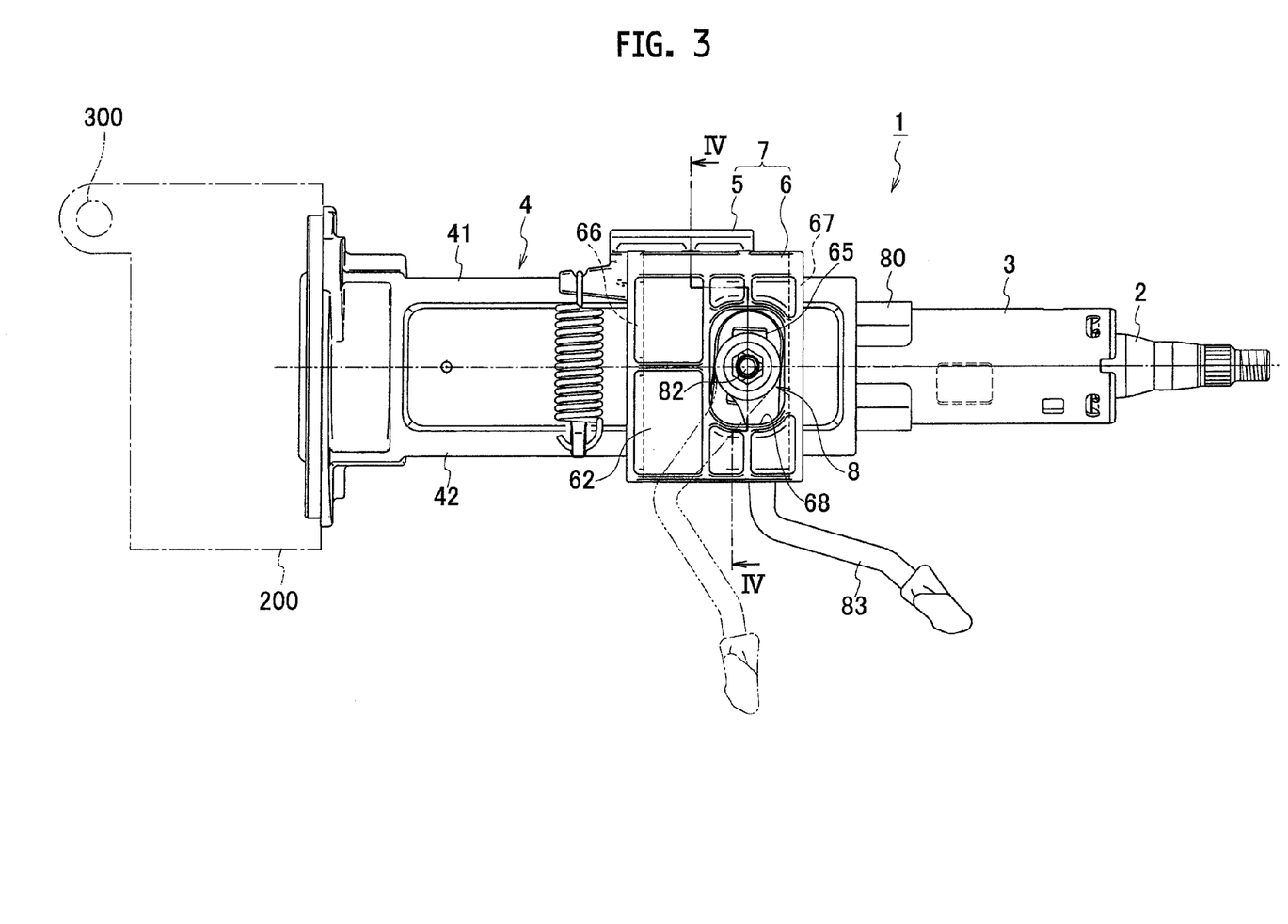
FIG. 3 is a front view of a steering column device according to an embodiment of the present invention.
Figure 4:
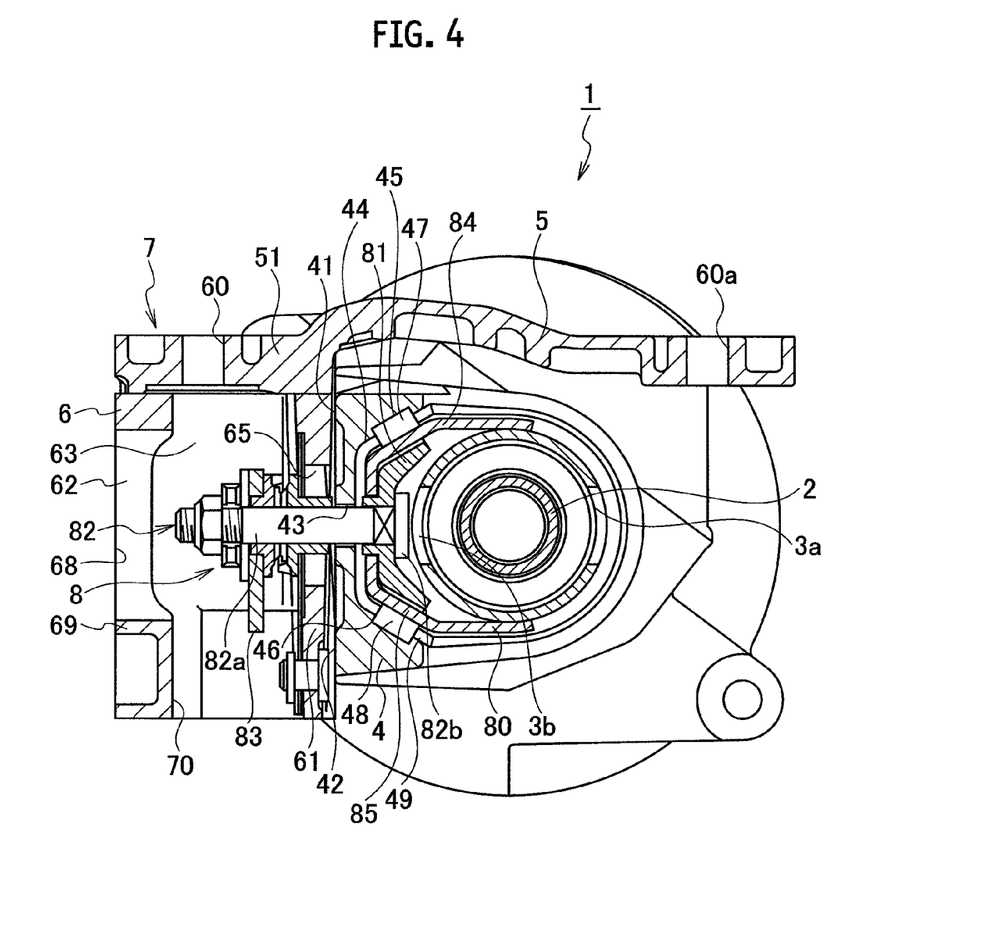
FIG. 4 is a cross-sectional view taken along the IV-IV line in FIG. 3.
Figure 5:
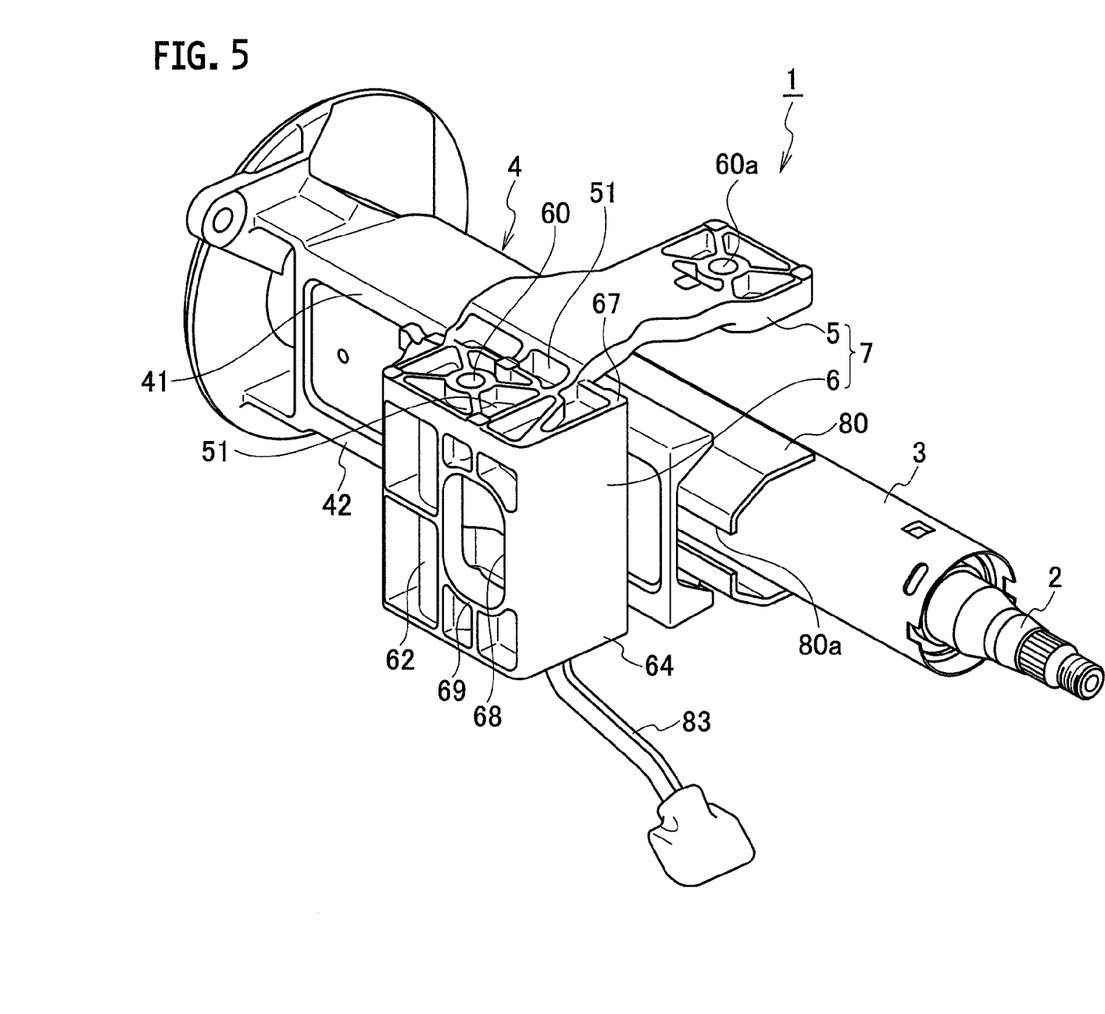
FIG. 5 is a perspective view of the steering column device according to the embodiment of the present invention.

As shown in FIG. 2, a steering column device 110 disclosed in Published Japanese Translation of PCT International Publication No. 2005-525958 includes a steering shaft 111 with an upper end in an axial direction to which a steering wheel (not shown) is to be fixed, a jacket 112 supporting the steering shaft 111 rotatably, a jacket bracket 113 attached on the jacket 112, a jacket guide 115 disposed between the jacket bracket 113 and the mount bracket 114 and configured to guide the jacket bracket 113, and a lock mechanism 117 configured to fasten and fix the jacket guide 115 to the mount bracket 114 by tightening a clamp bolt 116.

In the above-described configuration, when an unillustrated operating lever is rotated in a locking direction, the bolt 116 is pulled downward in FIG. 2 by an action of the lock mechanism 117, whereby the jacket guide 115 is locked to the mount bracket 114. Subsequently, when the operating lever is rotated in an unlocking direction, the bolt 116 moves upward in FIG. 2 by a lock release of the lock mechanism 117 to release the locked state of the jacket guide 115 to the mount bracket 114.

SUMMARY OF THE INVENTION

The technique described in Japanese Unexamined Patent Application Publication No. 2002-46623 employs the structure to support the jacket 102 from both sides by the mount bracket 103. Accordingly, the jacket 102 is supported with high support stiffness by the mount bracket 103. However, it is necessary to lock the jacket 102 while bending the mount bracket 103 and therefore to make an appropriate balance between bending and stiffness of the mount bracket 103.

The technique disclosed in Published Japanese Translation of PCT International Application No. 2005-525958 employs the structure to support one side by the mount bracket 114 via the jacket bracket 113. Accordingly, the mount bracket 114 does not have to be bent but needs to have sufficient stiffness ensured. In order to enhance a section modulus of the mount bracket 114, a steel bracket 118 for reinforcing the mount bracket 114 is provided between the jacket bracket 113 and the mount bracket 114. In this case, an offset dimension from a shaft center of the steering shaft 111 to the operating lever is increased. Accordingly, it is difficult to apply this technique if a position of the operating lever or a vehicle mounting position cannot be changed due to vehicle structure (layout) constraints. Moreover, an increase in length of the bolt 116 may cause the bolt 116 to tilt or rattle in an unlocking action.

It is also possible to enhance the section modulus of the mount bracket to ensure stiffness of the mount bracket by increasing a plate thickness of the mount bracket itself instead of providing the steel bracket 118 between the jacket bracket 113 and the mount bracket 114. However, this structure also bears the same problems as those described above due to an increase in the offset dimension from the shaft center of the steering shaft to the operating lever.

An object of the present invention is to provide a steering column device which includes a mount jacket having sufficient stiffness ensured while allowing reduction in an offset dimension from a shaft center of a steering shaft to an operating lever.

An aspect of the present invention is a steering column device comprising: a steering shaft having an upper end in an axial direction of the steering shaft for fixing a steering wheel; a jacket configured to support the steering shaft rotatably; a mount bracket including a fixation portion having a plate shape and to be fixed to a vehicle body, and a suspended portion hanging from the fixation portion; a jacket guide disposed between the jacket and the mount bracket and configured to guide the jacket; and a clamp bolt having a shaft penetrating the jacket, the mount bracket, and the jacket guide, wherein the suspended portion includes a first wall hanging from the fixation portion, being adjacent to the jacket guide, and extending along the jacket guide, a second wall hanging from the fixation portion on an opposite side from the jacket across the first wall and extending along the first wall, and a connecting portion hanging from the fixation portion and connecting at least any set of front ends and rear ends of the first wall and the second wall to each other, the fixation portion includes a surrounded portion surrounded by the first wall, the second wall, and the connecting portion, and operation of an operating lever protruding from the suspended portion actuates the clamp bolt to switch between a pressure contact state where the jacket and the mount bracket are in pressure contact with each other and a non-pressure contact state where the jacket and the mount bracket are not in pressure contact with each other.

According to this aspect, the suspended portion of the mount bracket is fixed to the vehicle body by way of the fixation portion, and the surrounded portion surrounded by the first wall, the second wall, and the connecting portions is formed on the fixation portion. Hence, it is possible to increase the section modulus of the mount bracket and to sufficiently ensure stiffness of the mount bracket. Moreover, since a space is formed inside the suspended portion surrounded by the first wall, the second wall, and the connecting portions, it is possible to connect one end of the operating lever to the clamp bolt inside the suspended portion. In this way, it is possible to suppress an offset dimension from a shaft center of the steering shaft to the operating lever. Hence, this aspect is applicable even when there are vehicle structure restrictions that do not allow changes in the position of the operating lever and the vehicle mounting position, for example. Moreover, since the clamp bolt is relatively short, it is also possible to prevent the bolt from tilting or rattling in the unlocking action.

The mount bracket may have at least two attachment portions formed in the fixation portion separately in the vehicle width direction for attachment of the mount bracket to the vehicle body, and one of the attachment portions may be located at the surrounded portion.

According to this configuration, when the mount bracket is attached to the vehicle body, the mount bracket is fixed to the vehicle body at two positions on respective right and left sides in the vehicle width direction. Moreover, an upper part of the suspended portion is fixed to the vehicle body. Hence, it is possible to enhance stiffness of the mount bracket or in particular to enhance stiffness of the suspended portion reliably, in a state where the mount bracket is attached to the vehicle body.

One of the first wall and the jacket guide may include a pair of first protrusions disposed separately in a first direction parallel to an axial direction of the steering shaft and extending in a second direction perpendicular to the axial direction of the steering shaft, the other one of the first wall and the jacket guide may include a pair of second protrusions disposed separately in the second direction and extending in the first direction, and each of the pair of first protrusions may contact both of the pair of second protrusions in the pressure contact state.

According to this configuration, the paired first protrusions protruding from the first wall of the suspended portion toward the jacket guide contact the paired second protrusions protruding from both ends in the lateral direction of the jacket toward the suspended portion at four positions in total. Hence, it is possible to lock the jacket guide onto the mount bracket stably and to enhance lock strength of the steering shaft.

The steering column device may further comprise a lock mechanism located in an inside of the suspended portion surrounded by the first wall, the second wall, and the connecting portion and configured to be rotated by the operating lever and to lock the jacket to the mount bracket via the clamp bolt. The suspended portion may have a lever insertion hole on a lower side of the suspended portion for disposing the operating lever rotatably through the lever insertion hole.

According to this configuration, the lock mechanism configured to lock the jacket onto the mount bracket by using the clamp bolt is housed inside the suspended portion surrounded by the first wall, the second wall, and the connecting portions and the operating lever is allowed to protrude outward through the lever insertion hole formed at the lower side of the suspended portion. In this way, it is possible to dispose the operating lever at a position where an offset dimension from the shaft center of the steering shaft is relatively short.

The second wall may have an opening in a region of the second wall opposed to the lock mechanism, and a reinforcing rib around the opening.

According to this configuration, the second wall includes the opening opposed to the lock mechanism. Hence, it is possible to assemble the lock mechanism through this opening. Meanwhile, it is possible to suppress reduction in stiffness of the suspended portion by reinforcing the part around the opening of the second wall by use of the reinforcing rib.

DETAILED DESCRIPTION OF THE EMBODIMENT

Hereinafter, an embodiment of the present invention will be described below with reference to the accompanying drawings.

As shown in FIG. 3 to FIG. 8, a steering column device 1 of this embodiment includes a steering shaft 2 with an upper end in an axial direction to which a steering wheel (not shown) is to be fixed, a jacket 3 supporting the steering shaft 2 rotatably, a jacket guide 4 serving as a fixed member configured to guide the jacket 3, a mount bracket 7 having a fixation portion 5 having substantially a plate shape and being fixed to a vehicle body (not shown) and a suspended portion 6 having a box shape and hanging from the fixation portion 5, and a lock mechanism 8 configured to lock the jacket 3 to the mount bracket 7.

Figure 8:
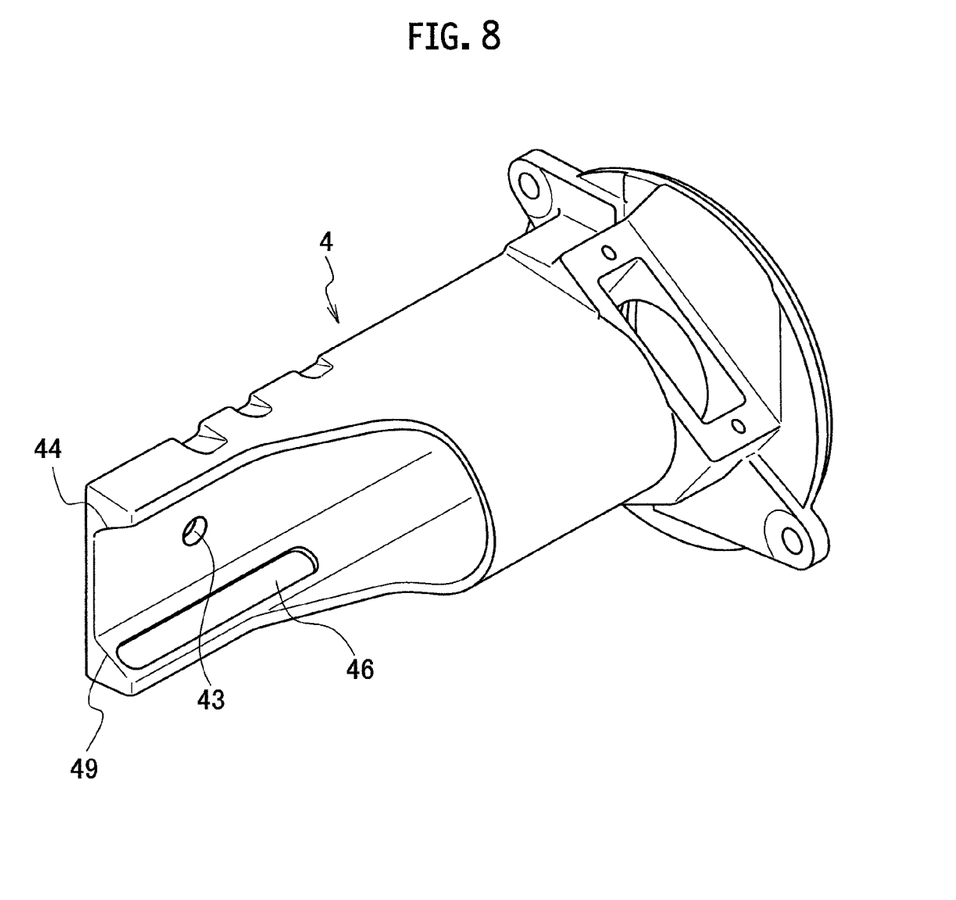
FIG. 8 is a perspective view of a jacket guide of the steering column device according to the embodiment of the present invention.

The jacket guide 4 extends in an axial direction of the steering shaft 2 and the jacket 3. A lower end in a longitudinal direction of the jacket guide 4 is supported by a vehicle body via a tilt shaft 300 provided to an electric power steering unit 200. The lower end of the jacket guide 4 is formed into a noncircular tube. Meanwhile, an upper end thereof is formed substantially into a C-shape in which one side is open. In this way, the jacket guide 4 and the jacket 3 as a whole are rotatable around the tilt shaft 300. On upper and lower ends inside the jacket guide 4, tapered guide surface 44 and 49 protruding and extending in the axial direction of the steering shaft 2 and the jacket 3 are formed. Fitting elongated holes 45 and 46 are formed on the guide surfaces 44 and 49. Sheet members 47 and 48 having substantially the same shape as the engagement elongated holes 45 and 46 and being made of metal or resin are fitted into the engagement elongated holes 45 and 46. The sheet members 47 and 48 are allowed to slide on guide surfaces 84 and 85 of a jacket bracket 80 to be described later. The jacket guide 4 includes paired upper and lower protrusions 41 and 42 which extend in the axial direction of the steering guide 2 and the jacket 3 and protrude from both ends in a lateral direction (a vertical direction in FIG. 3)

of the jacket guide 4 toward the suspended portion 6. In a locking action, the paired anteroposterior protrusions 41 and 42 (second protrusions) are allowed to contact paired upper and lower protrusions 66 and 67 of the suspended portion 6 to be described later at four positions in total.

Figure 6:
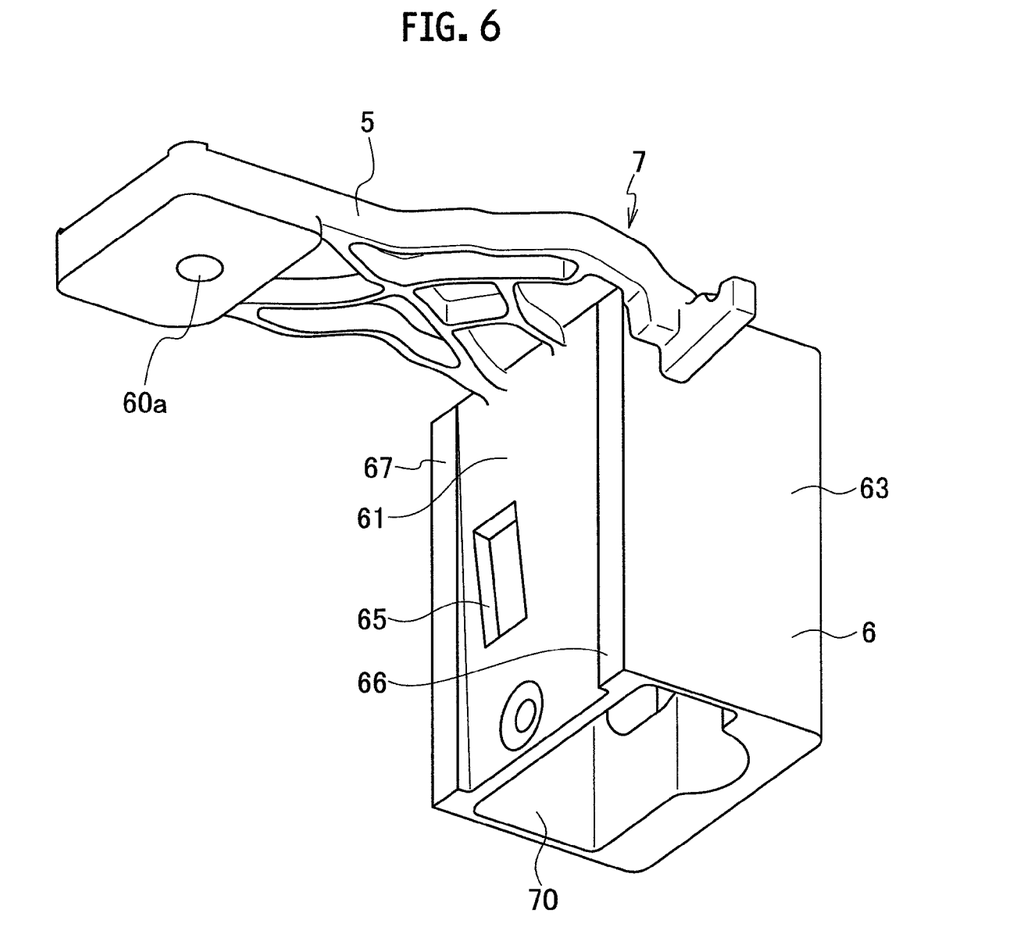
FIG. 6 is a perspective view of a mount bracket of the steering column device according to the embodiment of the present invention.

The mount bracket 7 includes the fixation portion 5 having substantially a plate shape and the suspended portion 6 having substantially a box shape, which are integrally formed by aluminum die-casting.

The fixation portion 5 includes attachment holes (attachment portions) 60 and 60*a* located at two positions on respective right and left sides in the vehicle width direction so as to stride over the jacket 3, and is attached to the vehicle body by use of attachment bolts (not shown). One of the attachment holes 60 is located on a surrounded portion 51 of the fixation portion 5 surrounded by a first wall 61, a second wall 62, a front side wall 63, and a rear side wall 64 to be described later.

The suspended portion 6 is formed substantially into a box shape by use of the first wall 61, the second wall 62, the front side wall (a connecting portion) 63, and the rear side wall (a connecting portion) 64. The first wall 61 is located adjacent to the jacket guide 4 and hangs from the fixation portion 5 along the jacket guide 4. The second wall 62 is located on the outside of the first wall 61 in the vehicle width direction and hangs from the fixation portion 5 along the first wall 61. The front side wall (a connecting portion) 63 hangs from the fixation portion 5 and connects front ends of the first wall 61 and the second wall 62 to one another. The rear side wall (a connecting portion) 64 hangs from the fixation portion 5 and connects rear ends of the first wall 61 and the second wall 62 to one another.

The first wall 61 includes an elongated hole 65 and paired upper and lower protrusions (first protrusions) 66 and 67. The elongated hole 65 extends in a tilt direction of the steering shaft 2 and allows insertion of a shaft 82*a* to be described later. The paired upper and lower protrusions 66 and 67 are located on both sides of the elongated hole 65 in a vehicle anteroposterior direction, extend in the vehicle vertical direction, and protrude toward the jacket guide 4. One of the upper and lower protrusions 66 and the front side wall 63 are provided on a common plane which is perpendicular to the jacket guide 4. Similarly, the other one of the front and rear protrusions 67 and the rear side wall 64 are also provided on another common plane which is perpendicular to the jacket guide 4. Therefore, steps are formed on both right and left ends of the first wall 61 by use of the upper and lower protrusions 66 and 67.

The second wall 62 includes an opening 68 opposed to the lock mechanism 8, and a reinforcing rib 69 is provided around the opening 68. A lever insertion hole 70, to which an operating lever 83 to be described later is rotatably inserted, is formed at a lower side of the suspended portion 6.

The front side wall 63 and the rear side wall 64 are formed into flat surfaces.

Figure 7:
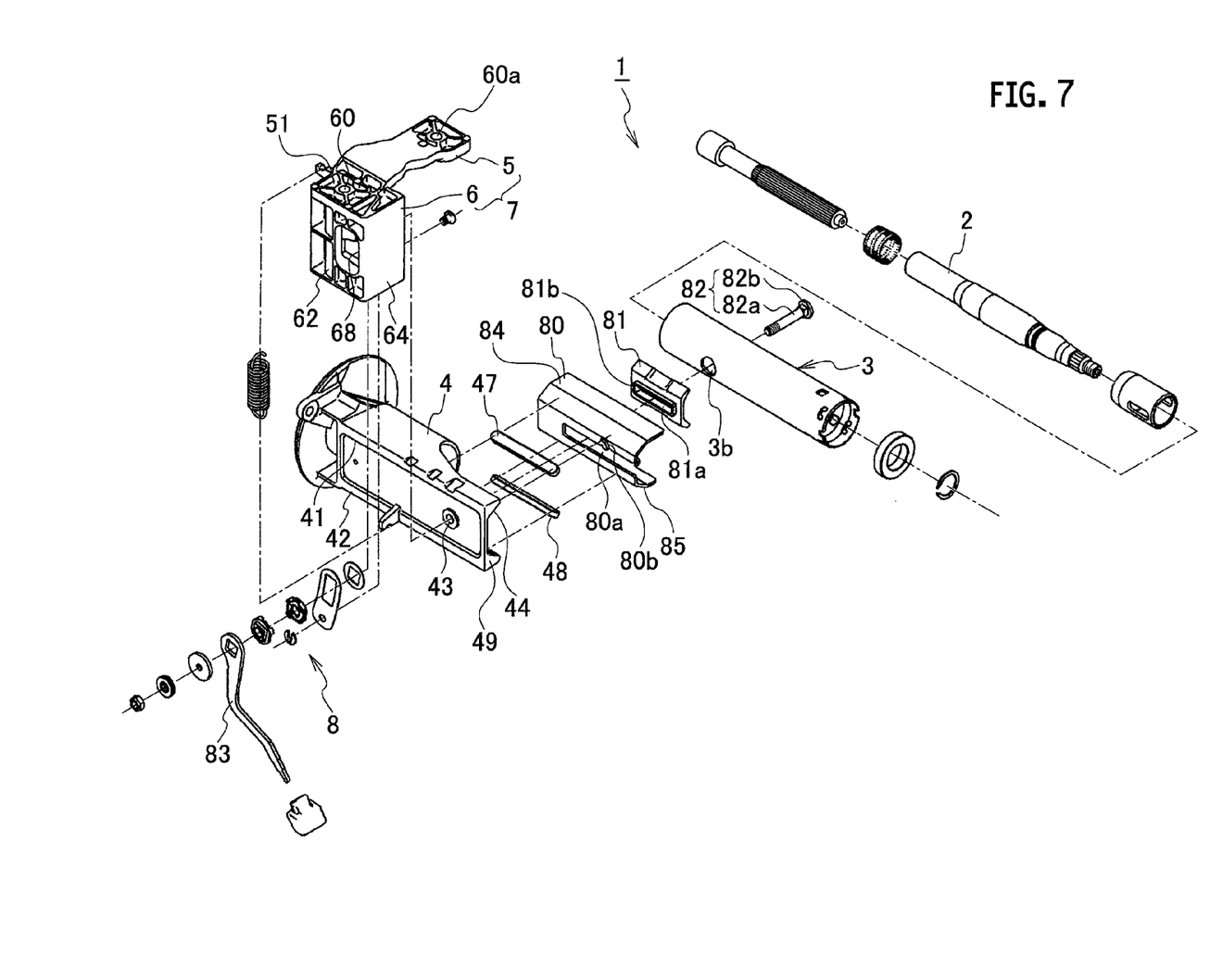
FIG. 7 is an exploded perspective view of the steering column device according to the embodiment of the present invention.

The lock mechanism 8 includes the jacket bracket 80 which is welded to the jacket 3 so as to extend in the axial direction of the jacket 3, a slide plate 81 attached to the jacket bracket 80 on the jacket 3 side thereof, a disengagement groove 80*a* formed on the jacket bracket 80, a plate slit 81*a* which is an elongated hole for telescopic movement formed on the slide plate 81, a clamp bolt 82 provided with a shaft 82*a* rotatably supported in a shaft hole 43 of the jacket guide 4, and an operating lever 83 to move the clamp bolt 82. The lock mechanism 8 is configured to fasten and fix the jacket 3 to the mount bracket 7 via the jacket guide 4 and the jacket bracket 80 by tightening the clamp bolt 82 by way of a rotating action of the operating lever 83. The tapered guide surfaces 84 and 85 extending in the axial direction of the jacket 3 are formed on upper and lower ends of the jacket bracket 80. The guide surfaces 84 and 85 are set parallel to the sheet members 47 and 48 provided on the guide surfaces 44 and 49 of the jacket guide 4 and are slidable on the sheet members 47 and 48.

In this configuration, when a driver of the vehicle rotates the operating lever 83 in a locking direction to tighten the clamp bolt 82, the head 82*b* of the clamp bolt 82 moves in a direction away from the jacket 3 (the left direction in FIG. 4) and comes into pressure contact with the slide plate 81. Moreover, the guide surfaces 84 and 85 of the jacket bracket 80 pressure contact the sheet members 47 and 48 provided on the guide surfaces 44 and 49 of the jacket guide 4 so that the jacket bracket 80 is fastened and fixed to the jacket guide 4 and the mount bracket 7, thereby regulating movement of the jacket 3 in the vertical direction (the tilt direction) or in the axial direction (a telescopic direction).

When the clamp bolt 82 is loosened by rotating the operating lever 83 in an unlocking direction, the head 82*b* of the clamp bolt 82 moves toward the jacket 3 (the right direction in FIG. 4), thereby fastening and fixation of the jacket bracket 80 is released. Hence, the jacket 3 can move in the vertical direction and the axial direction. In this way, it is possible to adjust a tilt position and a telescopic position of the steering shaft 2.

The slide plate 81 is fitted into the disengagement groove 80*a* of the jacket bracket 80 via a flange 81*b* and movement thereof is regulated by a latch 80*b* provided on the disengagement groove 80*a*. Thus, under normal conditions, movement of the jacket 3 in the telescopic direction is regulated within a range of an elongated hole of the plate slit 81*a*. If a driver bumps into a steering wheel and an impact force in the axial direction is applied to the steering shaft 2 (in a case of a second collision), the latch 80*b* provided on the disengagement groove 80*a* is deformed and is disengaged from the slide plate 81, thereby allowing the jacket 3 and the jacket bracket 80 to move further in a telescopic direction.

According to this embodiment, the suspended portion 6 of the mount bracket 7 includes not only the first wall 61 located adjacent to the jacket guide 4 but also the second wall 62 being located on the outside of the first wall 61 in the vehicle width direction and extending along the first wall 61, the front side wall 63 connecting the front ends of the first wall 61 and the second wall 62 to one another, and the rear side wall 64 connecting the rear ends of the first wall 61 and the second wall 62 to one another. Hence, the suspended portion 6 is formed substantially into a box shape. In this way, it is possible to increase a section modulus of the mount bracket 7 and to ensure sufficient stiffness of the mount bracket 7.

According to this embodiment, the lock mechanism 8 is housed inside the suspended portion 6 having substantially a box shape and the operating lever 83 is allowed to protrude outward through the lever insertion hole 70 formed on the lower side of the suspended portion 6. In this way, it is possible to dispose the operating lever 83 at a position where an offset dimension from the shaft center of the steering shaft 2 is relatively short, i.e., to suppress the offset dimension from the shaft center of the steering shaft 2 to the operating lever 83. Hence, it is possible to apply the steering column device 1 even in the case where there are vehicle structure restrictions that do not allow changes in a position of the operating lever and a vehicle mounting position, for example. Moreover, since the clamp bolt 82 is relatively short, it is also possible to prevent the bolt from tilting or rattling in an unlocking action.

According to this embodiment, when the mount bracket 7 is attached to the vehicle body, the mount bracket 7 is fixed to the vehicle body at two positions on respective right and left sides in the vehicle width direction. Moreover, an upper part of the suspended portion 6 is fixed to the vehicle body. Hence, it is possible to enhance stiffness of the mount bracket 7 or in particular to enhance stiffness of the suspended portion 6 reliably, in a state where the mount bracket 7 is attached to the vehicle body.

According to this embodiment, at the time of the locking action, the paired upper and lower protrusions 66 and 67 protruding from the first wall 61 of the suspended portion 6 toward the jacket guide 4 are proactively brought into contact with the paired front and rear protrusions 41 and 42 protruding from both ends in the short direction of the jacket guide 4 toward the suspended portion 6 at four positions in total. Hence, it is possible to lock the jacket guide 4 to the mount bracket 7 stably and to enhance lock strength of the steering shaft 2. Further, a load applied from the jacket guide 4 to one of the upper and lower protrusions 66 can be received by the front side wall 63 provided on a common plane perpendicular to the jacket guide 4. Similarly, a load applied from the jacket guide 4 to another one of the upper and lower protrusions 67 can be received by the rear side wall 64 provided on another common plane perpendicular to the jacket guide 4. Hence, it is possible to support the first wall 61 firmly by use of the front side wall 63 and the rear side wall 64, and thereby to further enhance stiffness of the mount bracket 7.

According to this embodiment, the second wall 62 of the suspended portion 6 includes the opening 68 opposed to the lock mechanism 8. Hence, it is possible to assemble the lock mechanism 8 through the opening 68. Meanwhile, it is possible to suppress reduction in stiffness of the suspended portion 6 by reinforcing the part around the opening 68 of the second wall 62 by use of the reinforcing rib 69.

Through holes 3a and 3b are also formed on the jacket 3 in order to facilitate attaching of the clamp bolt 82, whereby the clamp bolt 82 is attached on the jacket bracket 80 side while penetrating the through holes 3a and 3b. The tapered surfaces of the guide surfaces 44 and 49 may not be formed into parallel surfaces to the tapered guide surfaces 84 and 85 of the jacket bracket 80 due to formation by aluminum die-casting. However, by providing and adjusting the sheet members 47 and 48 appropriately on the guide surfaces 44 and 49 of the jacket guide 4, it is possible to allow the jacket guide 4 to slide constantly on the parallel planes to the guide surfaces 84 and 85 by way of the sheet members 47 and 48 and thereby to stabilize a tightening force in a locking action.

Now, a second embodiment of the present invention will be described below with reference to the accompanying drawings.

Figure 9:
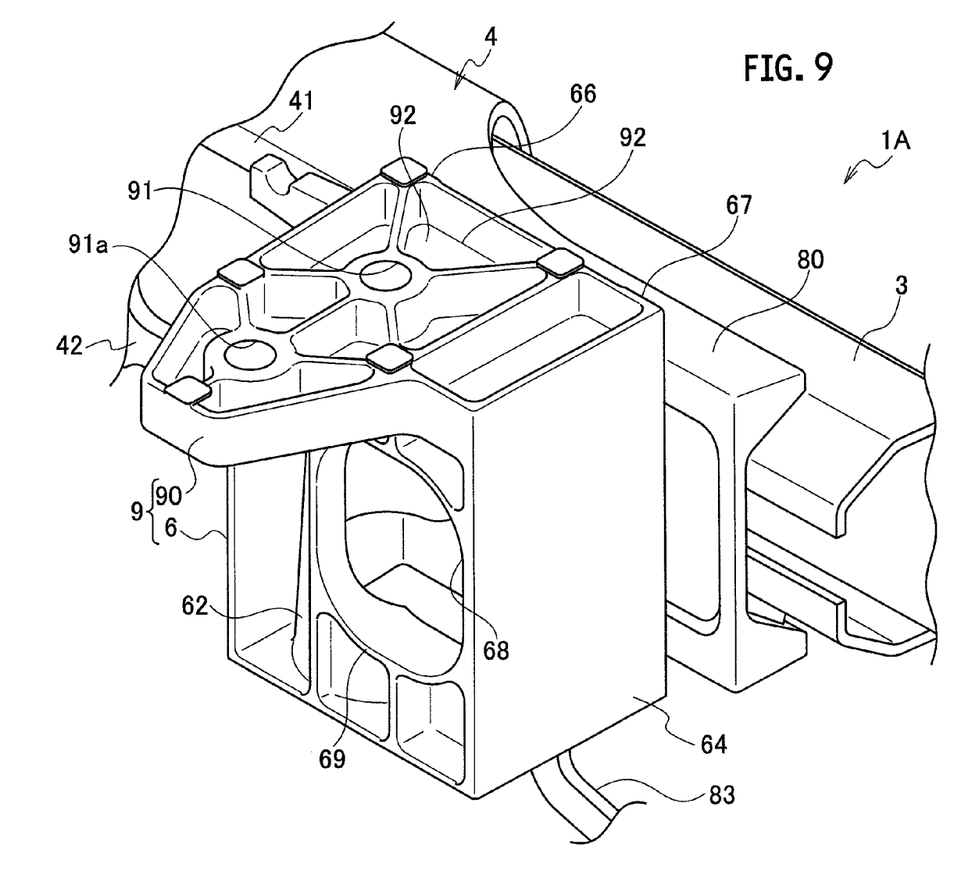
FIG. 9 is a perspective view of a mount bracket of the steering column device according to a second embodiment of the present invention.

FIG. 9 is a perspective view of a mount bracket of the steering column device 1A according to the second embodiment of the present invention. Other features of the embodiment are similar to those described in the first embodiment and description thereof will be omitted. Moreover, a mount bracket 9 of the second embodiment includes a fixation portion 90 having a different configuration from that of the mount bracket 7 of the first embodiment. However, the configuration of the substantially box-shaped suspended portion 6 in the second embodiment is similar to that in the first embodiment.

The fixation portion 90 is formed substantially into a plate shape and includes attachment holes (attachment portions) 91 and 91a located at two positions right and left in the vehicle width direction. One of the attachment holes 91 is located on a surrounded portion 92 of the fixation portion 90 surrounded by the first wall 61, the second wall 62, the front side wall 63, and the rear side wall 64. While the attachment holes 60 and 60a are provided so as to stride over the jacket 3 in the first embodiment, the fixation portion 90 is formed in this embodiment such that the other attachment hole 91a is located on an opposite side of the jacket 3 beyond the suspended portion 6.

This embodiment is effective in a case where it is not possible to ensure a space above the jacket 3 when attached to the vehicle, for example.

The first and second embodiments exemplifies the case where the mount bracket 7 includes the fixation portion 5, 90 and the suspended portion 6, which are integrally formed by aluminum die-casting. However, the present invention is not limited only to this configuration. For example, it is possible to connect a fixation portion to a suspended portion both of which are individually provided. Moreover, it is also possible to form a mount bracket by welding steel plates and the like instead of aluminum die-casting.

The jacket in the first and second embodiments is formed of two parts, namely, the jacket 3 and the jacket bracket 80. Instead, it is possible to form the jacket 3 and the jacket 80 integrally.

The first and second embodiments exemplify the case of attaching the mount bracket 7 to the vehicle body at two positions on respective right and left sides in the vehicle width direction. However, the present invention is not limited only to this configuration and the mount bracket 7 may be attached to the vehicle body at two positions along the vehicle anteroposterior direction. Moreover, it is also possible to increase or decrease the number of positions used for attaching the mount bracket 7 to the vehicle body when appropriate.

The first and second embodiments exemplify the case of forming the lever insertion 70 to which the operating lever 83 is rotatably inserted is formed at the lower side of the suspended portion 6. However, the present invention is not limited only to this configuration. The lever insertion hole may be formed on a rear side of the suspended portion 6 instead of the lower side of the suspended portion 6. Alternatively, the lever insertion hole may be formed in an area from the lower side to the rear side of the suspended portion 6.

The first and second embodiments exemplify the case of providing the front side wall 63 and the rear side wall 64, the front side wall 63 connecting the front ends of the walls 61 and 62 of the suspended portion 6 to one another, the rear side wall 64 connecting the rear ends of the walls 61 and 62 of the suspended portion 6 to one another. However, the present invention is not limited only to this configuration. It is also possible to provide connecting portions configured to connect the front ends to one another and the rear ends to one another, and to form openings on the front side and the rear side of the suspended portion.

The first and second embodiments exemplify the case of forming the suspended portion 6 substantially into a box shape which is a rectangular parallelepiped shape having substantially equal hanging dimensions from the fixation portion 5 or 90. However, the present invention is not limited only to this configuration. The suspended portion 6 may be formed into any shape other than the substantially box shape by independently setting hanging dimensions of the second wall 62, the front side wall 63, and the rear side wall 64 from the fixation portion 5 or 90 depending on a shape of a space in a vehicle interior where the suspended portion 6 is supposed to be installed, provided that such a shape can ensure sufficient stiffness.

Although the present invention has been described with certain embodiments, it is to be noted that the present invention is not limited only to these embodiments and various other modifications are possible without departing from the scope of the invention.

What is claimed is:

1. A steering column device comprising:
a steering shaft having an upper end in an axial direction of the steering shaft for fixing a steering wheel;
a jacket configured to support the steering shaft rotatably;
a mount bracket including a fixation portion having a plate shape and to be fixed to a vehicle body, and a suspended portion hanging from the fixation portion;
a jacket guide disposed between the jacket and the mount bracket and configured to guide the jacket; and
a clamp bolt having a shaft penetrating the jacket, the mount bracket, and the jacket guide,
wherein the suspended portion includes
a first wall hanging from the fixation portion, being adjacent to the jacket guide, and extending along the jacket guide,
a second wall hanging from the fixation portion on an opposite side from the jacket across the first wall and extending along the first wall, and
a connecting portion hanging from the fixation portion and connecting at least any set of front ends and rear ends of the first wall and the second wall to each other,
the fixation portion includes a surrounded portion surrounded by the first wall, the second wall, and the connecting portion, and
operation of an operating lever protruding from the suspended portion actuates the clamp bolt to switch between a pressure contact state where the jacket and the mount bracket are in pressure contact with each other and a non-pressure contact state where the jacket and the mount bracket are not in pressure contact with each other.

2. The steering column device according to claim 1, wherein
the mount bracket has at least two attachment portions formed in the fixation portion separately in the vehicle width direction for attachment of the mount bracket to the vehicle body, and
one of the attachment portions is located at the surrounded portion.

3. The steering column device according to claim 1, wherein
one of the first wall and the jacket guide includes a pair of first protrusions disposed separately in a first direction parallel to an axial direction of the steering shaft and extending in a second direction perpendicular to the axial direction of the steering shaft,
the other one of the first wall and the jacket guide includes a pair of second protrusions disposed separately in the second direction and extending in the first direction, and
each of the pair of first protrusions contacts both of the pair of second protrusions in the pressure contact state.

4. The steering column device according to claim 1, further comprising a lock mechanism located in an inside of the suspended portion surrounded by the first wall, the second wall, and the connecting portion and configured to be rotated by the operating lever and to lock the jacket to the mount bracket via the clamp bolt,
wherein the suspended portion has a lever insertion hole on a lower side of the suspended portion for disposing the operating lever rotatably through the lever insertion hole.

5. The steering column device according to claim 4, wherein the second wall has
an opening in a region of the second wall opposed to the lock mechanism, and
a reinforcing rib around the opening.

* * * * *